United States Patent
Moore

(10) Patent No.: US 9,457,703 B2
(45) Date of Patent: Oct. 4, 2016

(54) MOBILE TIRE STORAGE

(71) Applicant: William N. Moore, Davison, MI (US)

(72) Inventor: William N. Moore, Davison, MI (US)

( * ) Notice: Subject to any disclaimer, the term of this patent is extended or adjusted under 35 U.S.C. 154(b) by 0 days.

(21) Appl. No.: 15/044,334

(22) Filed: Feb. 16, 2016

(65) Prior Publication Data

US 2016/0236608 A1 Aug. 18, 2016

Related U.S. Application Data

(60) Provisional application No. 62/116,973, filed on Feb. 17, 2015.

(51) Int. Cl.
*B60P 3/00* (2006.01)
*B60R 25/01* (2013.01)

(52) U.S. Cl.
CPC . *B60P 3/00* (2013.01); *B60R 25/01* (2013.01)

(58) Field of Classification Search
CPC .................................. B60P 3/00; B60R 25/01
See application file for complete search history.

(56) References Cited

U.S. PATENT DOCUMENTS

| 3,987,915 | A | * | 10/1976 | Conner | B66C 1/422 212/342 |
|---|---|---|---|---|---|
| 2009/0245991 | A1 | * | 10/2009 | Cook | B60P 1/02 414/679 |
| 2009/0297306 | A1 | * | 12/2009 | Cook | B60P 1/02 414/426 |
| 2012/0027558 | A1 | * | 2/2012 | Weeden | A47B 81/007 414/800 |
| 2016/0122078 | A1 | * | 5/2016 | Clark | B65G 1/08 414/273 |

FOREIGN PATENT DOCUMENTS

| CA | 2532695 | * | 7/2007 |
| SU | 1194729 | A * | 11/1985 |

\* cited by examiner

*Primary Examiner* — Lori L Lyjak
(74) *Attorney, Agent, or Firm* — Price Heneveld LLP

(57) ABSTRACT

A method of storage for this tire storage system will be Semi-Trailers in various length and width, some being drop-deck van boxes, some straight van box trailers and various lengths from 24' to 53'. Also included are ground level containers ranging from 20' to 53' long; sometimes referred to as Conex boxes or overseas shipping containers. The inside of the trailer/container will have from one to thirty sections, each having one to six layers of storage space for the vertical storage of tires. Each section beams are adjustable from floor to ceiling. Beams will be between 3' and 15' in length.

5 Claims, 5 Drawing Sheets

MOBILE TIRE STORAGE

CROSS-REFERENCED TO RELATED APPLICATION

This application claims benefit under 35 USC section 119(e) of U.S. Provisional Application Ser. No. 62/116,973, filed Feb. 17, 2015, entitled MOBILE STORAGE LEASING, the entire contents of which are incorporated herein by reference.

BACKGROUND OF THE INVENTION

This invention relates to the process and method of tire storage, and, more particularly, how tires are able to be stored in mobile storage trailers and containers.

One typical tire storage method is to store tires in trailers using Conex™ boxes or using another method of racking and storing the tires, such as by laying them flat (horizontally) on a floor and stacking them on top of each other. This presents many challenges and problems. For example, the weight of the tires squeezes the tire's beads together (especially the bottom tire in the stack), thus causing problems when mounting the tire to a rim because the beads are no longer the right distance apart. Another one of the dangers of stacking tires is that when the stack of tires reaches a certain height, the tires become unstable, especially if tires in the stack are not all vertically aligned. This presents a safety threat to workers, both from the risk of the stack falling over and also from a worker awkwardly trying to lift/pull a tire off the top of the stack. It is desirable to provide a safer work environment by removing the dangers of stacking tires.

Still another issue concerns difficulties associated with trying to access, identify, select and remove tires from stored tires. For example, it is difficult to see the identification on stored tires laid flat on top of each other. Further, the arrangement can become very unorganized as tire(s) are selected and pulled out, especially when the tire(s) selected is not at a top of the stack. These problems are compounded due to the dark/dirty environment where tires are often stored. A considerable amount of manpower is used when tires are delivered, in terms of unloading the tires, and moving the tires to a desired storage area while trying to keep some sense of tire organization. This includes stacking and restacking the tires on top of each other, which can cause worker back issues, especially while trying to form stacks that are well organized and stable (and that do not have tires vertically misaligned with other tires in the stacks). The amount of time spent moving, stacking, and restacking tires is manually intensive, and undesirably inefficient and costly.

SUMMARY OF THE PRESENT INVENTION

In one aspect of the present invention, a tire storage system includes a semi trailer with a floor, opposing walls, and a ceiling defining an internal storage space; and right and left racks extending a majority of a length of the semi trailer. The right and left racks each have horizontally-spaced pairs of first beams supported by vertically-spaced pairs of second beams, with the second beams on the right and left racks defining an access pathway therebetween. The first beams defe at least a lower tier, a middle tier and an upper tier, with the first and second tiers each having a width suitable for storing tires in a vertical orientation with treads facing toward the access pathway in a configuration where a worker can see identification on each tire stored on the racks and where the worker can select any specific tire without moving a second tire out of the way.

In another aspect of the present invention, a method includes providing a semi trailer with a floor, opposing walls, and a ceiling defining an internal storage space; and installing right and left racks in the internal storage space with the racks each extending a majority of a length of the semi trailer. The right and left racks each have horizontally-spaced pairs of first beams supported by vertically-spaced pairs of second beams, with the second beams on the right and left racks defining an access pathway therebetween. The first beams define at least a lower tier, a middle tier and an upper tier with the first and second tiers each having a width suitable for storing tires in a vertical orientation with treads facing toward the access pathway. The method includes viewing and identifying individual tires stored on the racks until a specific tire is found; and selecting and removing the specific tire without moving a second tire out of the way.

An object of the present invention is to store tires in mobile storage units in a way that facilitates identification, selection, and removing the tires, while minimizing manual labor in the process and while maximizing efficient and well organized storage adapted to fit client's specialized needs.

An object of the present invention is to store tires in mobile storage units reduce the amount of storage space needed to store the same amount of tires that were being stacked horizontally onto one another. For example, the present innovative storage system allows about 100%-300% more tires to be stored in the same amount of cubic feet. This greatly reduces the amount of storage units needed by each customer. It also reduces clutter inside the customer's tire store, giving them the ability to store more tire and to do so a secure (lockable) trailer/container outside.

These and other aspects, objects, and features of the present invention will be understood and appreciated by those skilled in the art upon studying the following specification, claims, and appended drawings.

DETAILED DESCRIPTION OF EMBODIMENTS

Figure 1:
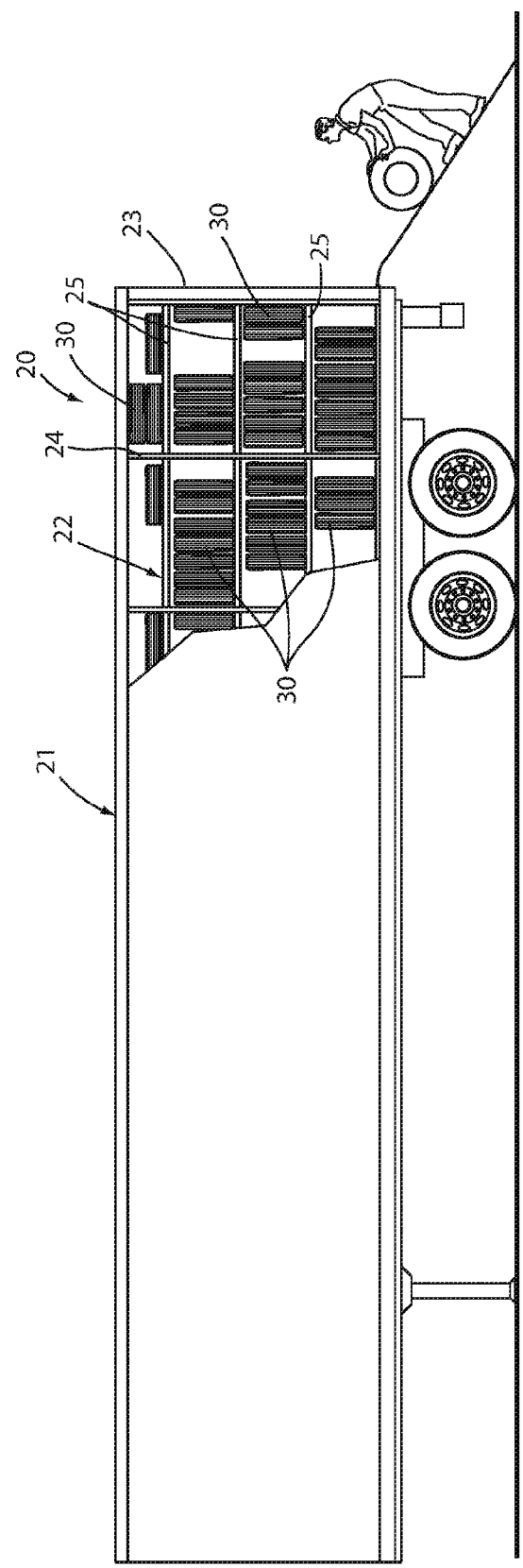
FIG. 1 is a side view of a semi trailer with sidewall partially broken away to show the present innovative storage rack inside.
Figure 2:
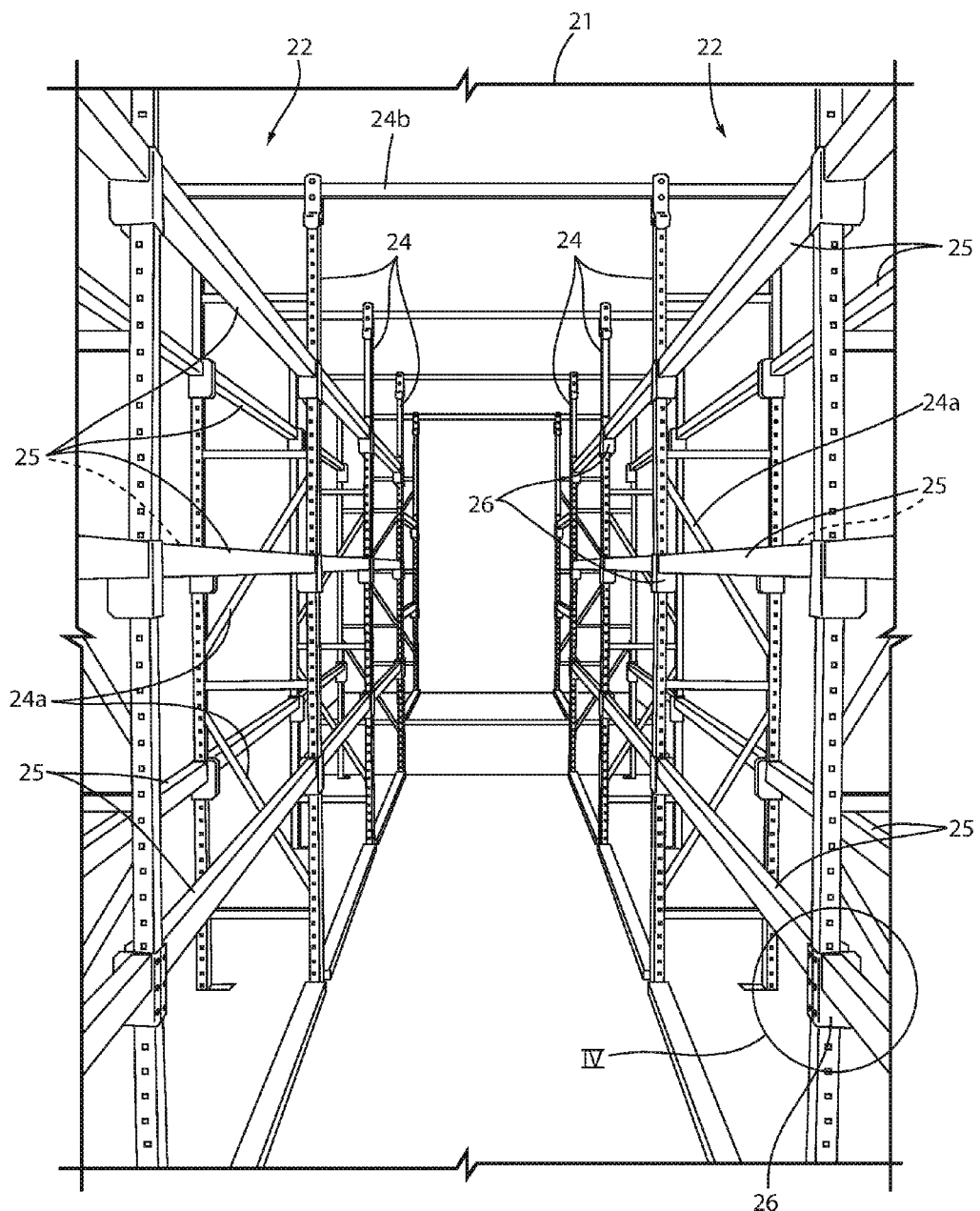
FIGS. 2-3 are perspective views of the storage unit in FIG. 1 from the inside/end of the trailer, FIG. 2 showing an empty rack without tires, and FIG. 3 showing tires stored on various tiers of the rack.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
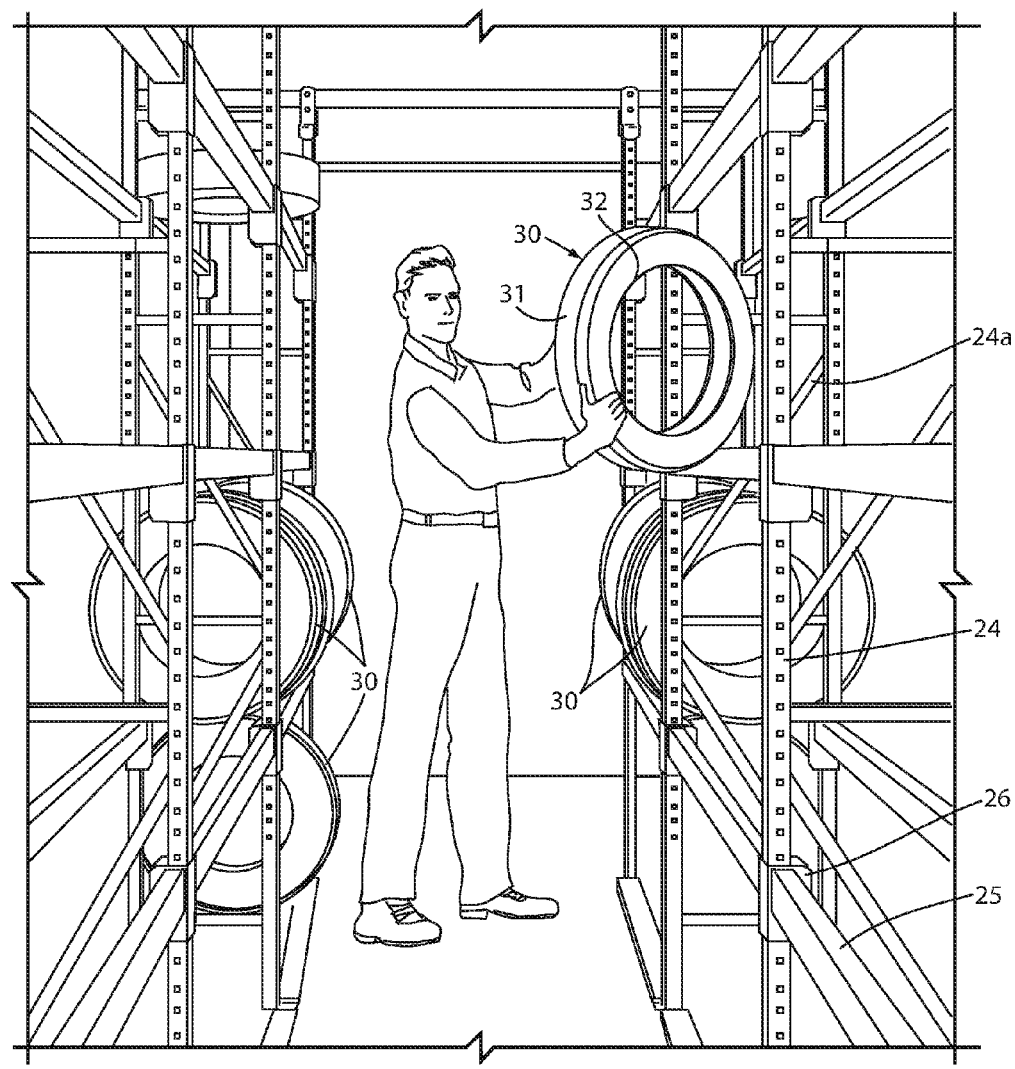
Figure 4:
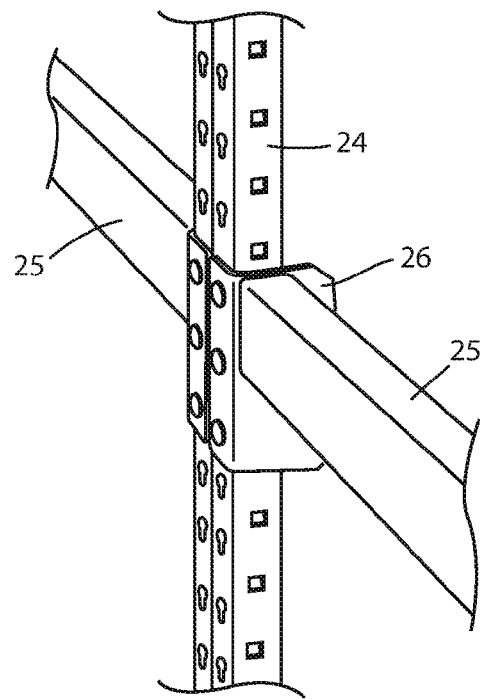
FIGS. 4-5 are assembled and exploded fragmentary views showing details of the horizontal and vertical beams of the rack and the attachment bracket used to connect them.
Figure 5:
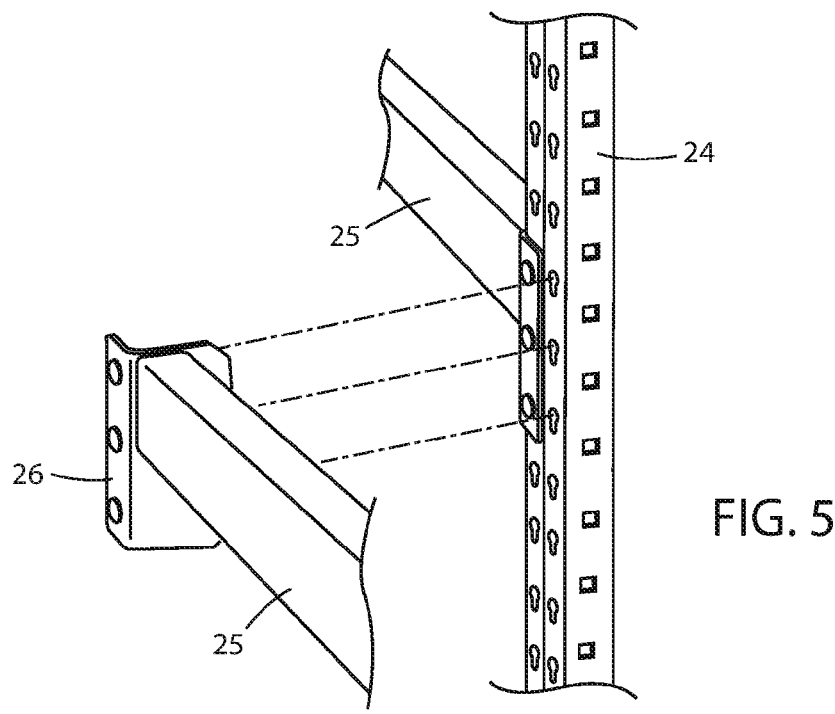

The present apparatus 20 (FIGS. 1-5) includes an enclosed wheeled storage trailer 21 or container, with racks 22 along each side for a length of the container, opening to the trailer's lockable rear access doors 23. The racks 22 (FIG. 3) on each side include pairs of vertical beams 24 (held together by angled braces 24A and anchored at top and bottom locations by anchors 24B), and a plurality of horizontal pairs of beams 25 adjustably supported on the vertical beams 24 by brackets 26. Notably the vertical beams 24 can be positioned at desired spacings along a length of the trailer, and the horizontal beams 25 attached at desired height locations to the vertical beams 24. The horizontal beams 25 can be as long or short as desired, with aligned ones of the horizontal beams 25 being spliced together by an elongated connector (such as an L-shaped alignment bracket, not shown).

The vertical beams 24 include regularly spaced holes, and the horizontal pairs of beams 25 are vertically adjustable on the vertical beams 24 by selectively bolting brackets 26 to the holes in the vertical beams 24. The illustrated arrangement of horizontal beams 25 forms three tiers for holding tires 30 vertically, and a top tier (near the trailer's ceiling) for holding one or two tires 30 horizontally. The tires 30 are rested on the horizontal pairs of beams 25 of the first three tiers, with the tire tread 31 engaging the horizontal beams 25 and the tire bead 32 positioned so that it is not distorted by weight of other tires 30. The tires 30 are all held in a manner permitting easy identification and access.

This tire storage system can be used in semi trailers of various lengths and widths, some being drop-deck van boxes, some being straight van box trailers of various lengths from 24' to 53'. Also the present innovation includes ground level containers ranging from 20' to 53' long; sometimes referred to as Conex boxes or overseas shipping containers. The inside of the trailers/containers can have from one to thirty sections, and each can have one to six layers of storage space for the vertical storage of tires. Each of the horizontal beams are adjustable in height from floor to ceiling. The horizontal beams will be typically be between 3' and 15' in length.

The vertical storage of the tires provides ease of access to bar codes on the tires, and open visual and physical access to the tires themselves, including tire sidewalls (depending on closeness of adjacent tires) and tire treads. Thus inventory is much easier to track and manage. Also, the beads do not become compressed and distorted during storage. Also, the arrangement of tires tends to stay organized, or at least is easily organized if they become disheveled.

Figure 6:
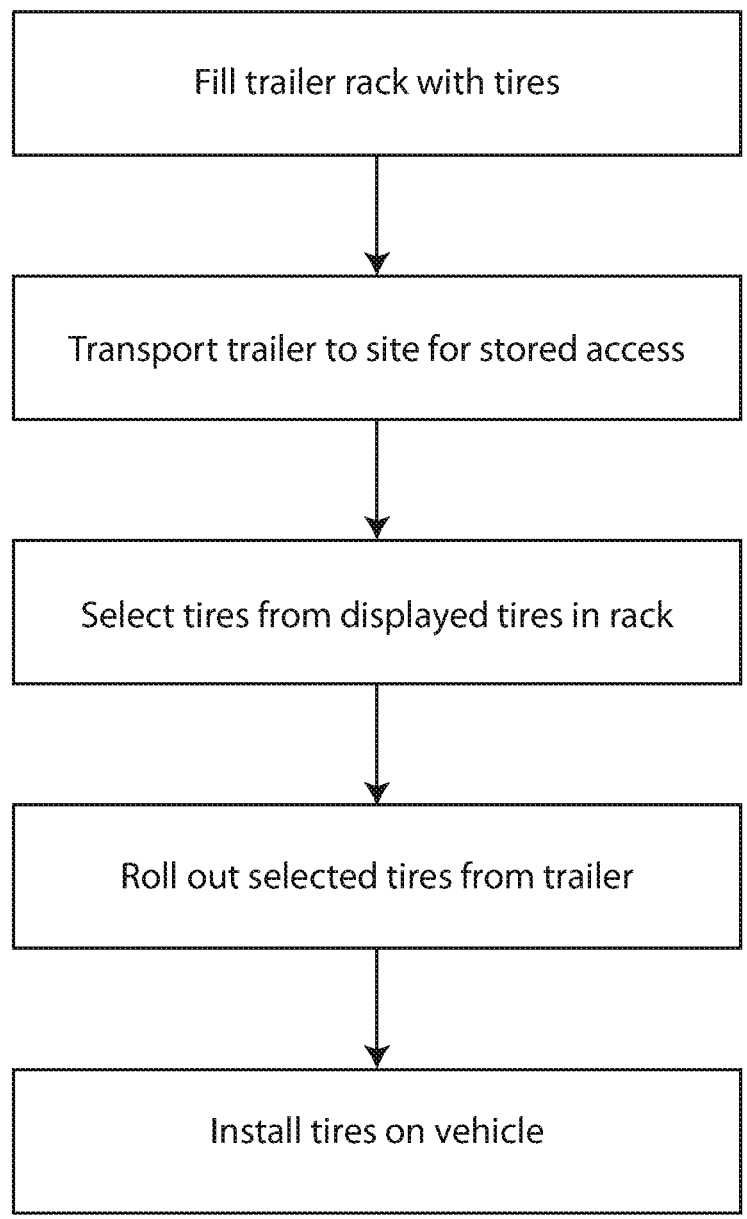
FIG. 6 is a method flow diagram showing a method of use as shown in FIGS. 1 and 4.

The present method (FIGS. 1, 3 and 6) includes filling a trailer rack with tires, transporting the trailer to a site for stored access, selecting stored tires from the racks (with the tires oriented vertically, resting on their treads, and arranged in rows for visual and physical access). The method further includes finding, selecting, pulling, and rolling out selected tires from the trailer as desired for use and installation on vehicle rims.

It will be understood by one having ordinary skill in the art that construction of the described invention and other components is not limited to any specific material. Other exemplary embodiments of the invention disclosed herein may be formed from a wide variety of materials, unless described otherwise herein. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

It will be understood that any described processes or steps within described processes may be combined with other disclosed processes or steps to form structures within the scope of the present invention. The exemplary structures and processes disclosed herein are for illustrative purposes and are not to be construed as limiting. It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A tire storage system comprising:
a semi trailer with a floor, opposing walls, and a ceiling defining an internal storage space; and
right and left racks extending a majority of a length of the semi trailer, the right and left racks each having horizontally-spaced pairs of first beams supported by vertically-spaced pairs of second beams, the second beams on the right and left racks defining an access pathway therebetween, the first beams defining at least a lower tier, a middle tier and an upper tier with the first and second tiers each having a width suitable for storing tires in a vertical orientation with treads facing toward the access pathway in a configuration where a worker can see identification on each tire stored on the racks and where the worker can select any specific tire without moving a second tire out of the way.

2. The tire storage system of claim 1, wherein the right and left racks include brackets and fasteners, and the right and left racks each consist of the first and second beams interconnected by the brackets and fasteners.

3. A method of tire storage comprising:
providing a semi trailer with a floor, opposing walls, and a ceiling defining an internal storage space;
installing right and left racks in the internal storage space with the racks each extending a majority of a length of the semi trailer, the right and left racks each having horizontally-spaced pairs of first beam supported by vertically-spaced pairs of second beams, the second beams on the right and left racks defining an access pathway therebetween, the first beams defining at least a lower tier, a middle tier and an upper tier with the first and second tiers each having a width suitable for storing tires in a vertical orientation with treads facing toward the access pathway;
viewing and identifying individual tires stored on the racks until a specific tire is found; and
selecting and removing the specific tire without moving a second tire out of the way.

4. The method of claim 3, including moving the stored tires to a location adjacent but outside a tire store.

5. The method of claim 4, including locking the semi trailer closed to prevent unauthorized access to the stored tires.

* * * * *